United States Patent [19]

Miyamoto et al.

[11] 4,345,522

[45] Aug. 24, 1982

[54] AERIAL TRANSPORT SYSTEM

[75] Inventors: Keiichi Miyamoto; Naohiko Inoue, both of Yokohama; Yasuhisa Takeuchi, Yokosuka, all of Japan

[73] Assignee: Nissan Motor Company, Limited, Yokohama, Japan

[21] Appl. No.: 110,333

[22] Filed: Jan. 8, 1980

[30] Foreign Application Priority Data

Feb. 11, 1979 [JP] Japan .................................. 54-14598
Feb. 20, 1979 [JP] Japan .................................. 54-17834

[51] Int. Cl.³ .......................... B61B 3/02; B60L 15/22
[52] U.S. Cl. ....................................... 104/89; 104/298; 104/299; 104/301; 105/148; 246/31; 246/34 R
[58] Field of Search ............... 104/288, 295, 298, 299, 104/301, 89; 246/31, 34 R, 187 B, 187 C; 105/148

[56] References Cited

U.S. PATENT DOCUMENTS

| | | | |
|---|---|---|---|
| 2,164,331 | 7/1939 | Loughridge | 246/31 |
| 2,255,797 | 9/1941 | Loughridge | 246/31 X |
| 3,263,625 | 8/1966 | Midis et al. | 246/187 B X |
| 3,967,801 | 7/1976 | Baughman | 246/187 B |
| 3,979,092 | 9/1976 | Perry et al. | 246/34 R |
| 4,015,807 | 4/1977 | Bourree et al. | 246/187 B |
| 4,202,273 | 5/1980 | Matsui et al. | 104/298 |
| 4,227,666 | 10/1980 | MacMunn et al. | 246/187 C |

FOREIGN PATENT DOCUMENTS

| | | | |
|---|---|---|---|
| 49260 | 12/1918 | Sweden | 104/298 |
| 390957 | 4/1933 | United Kingdom | |
| 899086 | 6/1962 | United Kingdom | |
| 1102054 | 2/1968 | United Kingdom | |
| 1560266 | 2/1980 | United Kingdom | |

Primary Examiner—Randolph A. Reese
Attorney, Agent, or Firm—Lane, Aitken, Kice & Kananen

[57] ABSTRACT

Disclosed is an aerial transport system which comprises an aerial track having therealong a pair of electric current-carrying cables in a parallel relationship with respect to one another and with respect to the track, and self-propelled carriages. Each carriage has an electric current collector to collect electric power from the current-carrying cables and to supply the power to an electrical driving mechanism mounted thereon for driving wheels engaging with the track. The current-carrying cables are separated at longitudinal given intervals so as to define respectively independent electric power supply zones. The transport system further includes a system for controlling electric power supply for the vehicle or carriage including a mechanism for detecting a vehicle or carriage position in the track provided in each power supply zone. The vehicle or carriage position detecting mechanism has a circuit which is closed when the vehicle or carriage is present within the zone, and a detector for detecting an electric current flowing in the zone when the circuit is closed. The detector is associated with a holding relay control circuit. The holding relay controls an electric power supply control circuit having a controlling contactor connected with a contact of the holding relay.

39 Claims, 8 Drawing Figures

(PRIOR ART)

(PRIOR ART)

(PRIOR ART)

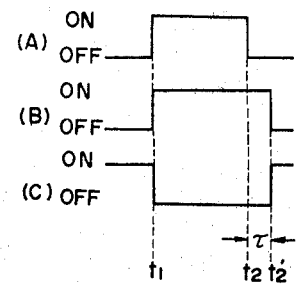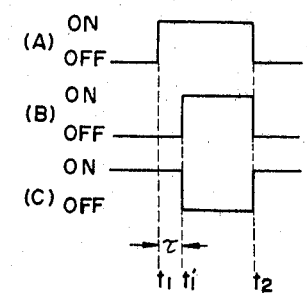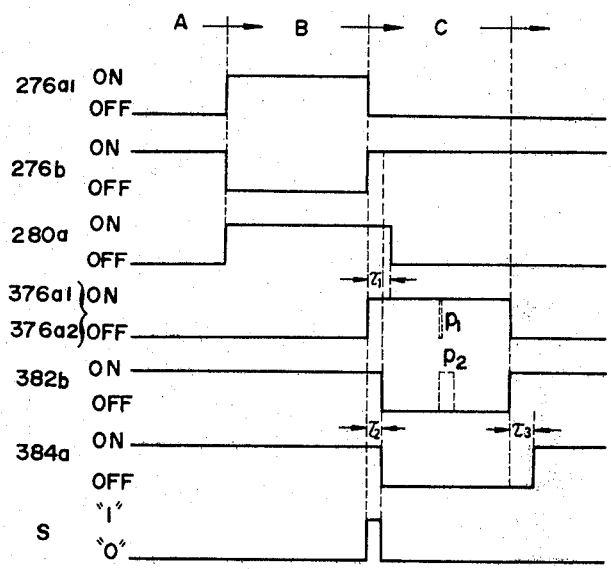

AERIAL TRANSPORT SYSTEM

BACKGROUND OF THE INVENTION

1. Field of the Invention

The present invention generally relates to an aerial transport system having a self-propelled vehicle or carriage, such as a tramway or cableway. More specifically, the invention relates to an improvement in a means for controlling an electric power supply for the vehicle or carriage, in which the means includes a means for detecting a vehicle or carriage position in the aerial tramway or cableway. Further, the invention relates to an improvement in a vehicle or carriage position detecting means capable of detecting a position of the vehicle or carriage on the track. The invention yet further relates to a control system for controlling an electric power supply for the vehicle or carriage and being co-operative with the vehicle or carriage position detecting means.

2. Description of the Prior Art

The aerial transport system, such as a tramway or cableway system, generally comprises a tramway or cableway, a self-propelled vehicle or carriage, having electrical driving means moving the tramway or cableway, and an electric power supplying means including a pair of electric current-carrying cables which are positioned apart from one another and in parallel relationship with respect to each other and the tramway or cableway.

One of the typical and general constructions of the aerial transport system will be schematically illustrated and shown in FIG. 1. In FIG. 1, a cable 1, for supporting a carriage 2 and defining a cableway is supported by stationary towers (not shown) arranged at regular intervals along the cableway. A pair of electric current-carrying cables 3 are supported by the supporting cable 1 by means of known suspension members such as a plurality of brackets (not shown).

The carriage 2 has driving wheels 4 engaging or riding on the supporting cable 1 so as to suspend the carriage 2 through suspension member 5 and move the carriage 2 along the tramway or cableway. The carriage 2 has an electric current collecting means 7 including current collecting shoes 8 for sliding contact with the current-carrying cables 3 and collecting electric power from the cables 3. The carriage 2 has an electric driving means, such as an electric driving motor (not shown), to be driven by the electric power collected by the current collecting means 7. Thus, the vehicle or carriage is propelled to move along the tramway or cableway by the driving means whose driving power is transmitted to the driving wheels through transmission means (not shown). Practically, in such a self-propelled vehicle or carriage, the transmission means is received within the suspension member 5.

In a transport system such as the aforementioned, the operation of the carriage or vehicle is generally performed under an automatic centralized control system without a driver riding in each carriage or vehicle. Therefore, to provide sufficient safety or security in operation is one of the most important matters for such a system. To fulfill safety requirements, the carriage or vehicle is provided with a automatic braking device, such as an electromagnetic brake, which is operative when power is not supplied to the carriage or vehicle.

The current-carrying cables are separated or divided at regular intervals to define, independent power supply zones. In each power supply zone, there is provided a means for controlling the power supply with respect to carriage or vehicle positions in the tramway or cableway; namely, the control means operates to cut the power supply for the carriage or vehicle so as to actuate the braking device, when the preceding carriage is in an adjacent zone.

A typical and general electric power supply control system is schematically illustrated and shown in FIG. 2. A pair of current-carrying cables 22, 24 are respectively separated or divided by insulating members 26 at regular intervals so as to define, respectively independent power supply zones I, II, III . . . The following explanation applies, by way of example, to the power supply to zone I; only the corresponding control circuit for zone I is shown in FIG. 2. Respective current-carrying cables 22, 24 are connected to power supply cables 28, 30 respectively through a power supply controlling circuit 40. The power supply control circuit 40 is connected to a holding relay circuit 50. The holding relay circuit 50 is connected to carriage or vehicle position detecting means 62, 64 provided in the power supply zones II and III. In FIG. 2, the detecting means 62 in the zone II is connected to a reset-input R of the holding relay circuit 50; the detecting means 64 in the zone III is connected to a set-input S of the holding relay circuit 50. Thus, when the detecting means 62 detects a vehicle or carriage in the zone II, the holding relay circuit 50 is put in the OFF position so as to actuate the power supply control circuit 40 for breaking the power supply to the zone I. When the carriage or vehicle leaves zone II and is detected in zone III by the detecting means 64, the holding relay circuit 50 goes into the ON position and the power supply control circuit 40 supplies power to the current-carrying cables 22, 24 in the zone I. This position of the holding relay circuit 50 is maintained until the next occasion when the carriage or vehicle position detecting means 62 of the zone II detects the following carriage or vehicle in the zone II.

The power supply control circuit 40 according to the prior art will be schematically illustrated and shown in FIG. 3. The current-carrying cables 22, 24 are connected to the power cables 28, 30 through circuit breakers 42, 44 and contacts 46, 47 of a contactor 48. The contactor 48 is operated or controlled by a contact 52 of the holding relay 50.

In practice, circuit breakers and/or a contact 46 or 47 need only be provided in one of the leads connecting the power cables and the current-carrying cables. However, FIG. 3 shows circuit breakers and contacts being provided on both leads, as in the usual manner.

The carriage 2 travels through the cableway with the current collecting means 7. The current collecting means 7 includes the current collecting shoes 8 contacting the current-carrying cables 22, 24. An electric current thus flows through the power supply circuit to the driving means 9 of the carriage.

Upon the absence of a prior carriage in the adjacent forward zone, the holding relay circuit 50 operates so as to close the contact 52. The contactor 48 is then excited to close the contacts 46, 47 so that electric power can be supplied to the respective current-carrying cables 22, 24 from the power cables 28, 30.

If there is a prior carriage in the adjacent forward zone, the holding relay circuit 50 is inoperative, thereby opening contact 52. The contactor 48 is not excited and thus opens the contacts 46, 47. The electric power supply circuit is thus broken to cease supplying power to the current-carrying cables 22, 24. If there is a carriage in the present zone, it may be stopped by actuating the automatic braking device, such as the electromagnetic brake (not shown) mounted on the carriage.

The automatic braking device has a braking member which can be pressed against the driving wheels or driving means by a spring, when an actuation means of the braking device is not energized. When the electric power is not supplied to the brake means, the actuation means is inoperative. Thereby, the brake means is free from the force of the actuation means so as to contact the driving wheels and so on. Preferably, the automatic braking device may also be actuated when less than a predetermined current is supplied.

Meanwhile, to control the power supply to the independent zones I, II, III . . . in the aerial transport system, it is necessary to detect whether or not a vehicle or carriage is present within each zone. Therefore, there are provided vehicle or carriage position detecting means 60, 62, 64 . . . , in zones I, II, III . . . , respectively, as shown in FIG. 2.

In the prior art, there are various vehicle or carriage position detecting systems. One of the systems comprises one or more limit switches mounted on arms of cable supporting brackets which support the current-carrying cable in each power supplying zone. A flange portion of the wheels of the vehicle or carriage contacts at least one of the switching arms of the limit switches so as to actuate the same. Another system comprises one or more proximity switches mounted on the arms of cable supporting brackets in each power supplying zone. The proximity switch actuates when the lower portion of the current collecting means of the vehicle or carriage passes through the nearest point to the switch.

In the prior systems, the limit switches or proximity switches are mounted on the arms of the brackets which are positioned at high elevations and which may cause danger, inconvenience and further problems in mounting or mending the same. Further, the limit switches or proximity switches merely detect passing of the vehicle or carriage at the points where they are provided. Therefore, the switches may not detect for example a stationary carriage which has broken down in the power supplying zone. For accuracy in controlling the power supply, further scanning systems have been required, for example an electric sensing system of the vehicle or carriage position.

The present invention aims to improve the aforementioned disadvantages and difficulties in the prior art and to provide a novel and useful vehicle or carriage position detecting means which can detect whether or not there is a vehicle or carriage within the zone. Further, the invention aims to provide a control system for controlling the electric power supply to the zone, and thus control the driving of the vehicle or carriage.

SUMMARY OF THE INVENTION

Therefore, it is an object of the present invention to provide an electric power supply control means including a vehicle or carriage position detecting means which can detect whether or not there is a vehicle or carriage within a power supply zone.

Another object of the present invention is to provide a vehicle or carriage position detecting means which is operative even when the driving means of the vehicle or carriage is in the braked position or has stopped at a station.

Still another object of the invention is to provide a vehicle or carriage position detecting means which detects the vehicle or carriage within the zone by detecting an electric current flowing in the zone.

Still another object of the invention is to provide a vehicle or carriage position detecting means detecting the vehicle or carriage within a power supply zone by a relay which detects electric current flowing in the zone and is electrically associated with the relay provided in the power supply control circuit in the other zones so as to maintain an interrelational control system for safe operation.

A further object of the present invention is to provide a power supply control system for an automatically driven aerial transport system, said control system co-operating with the vehicle or carriage position detecting means.

A still further object of the invention is to provide a power supply control system having a plurality of relays co-operatively associated or connected with respect to respective adjacent relays so as to control the power supply of respective power supply zones.

A still further object of the invention is to provide a power supply control system which operates to break the power supply circuit to stop the supply of electric power to the driving means mounted on the vehicle or carriage, when the vehicle or carriage position detecting means in the adjacent forward zone detects a vehicle or carriage within the adjacent forward zone, for safety and security of the automatic operation of the aerial transport system.

The other objects and advantages will be illustrated and made clear by the following descriptions.

BRIEF DESCRIPTION OF THE DRAWINGS

The present invention will be more fully understood from the detailed description given below, and from the accompanying drawings of a preferred embodiment of the present invention, which, however, are not to be taken as limitative of the present invention in any way, but are for the purposes of elucidation and explanation. In the drawings:

FIG. 6 is a time chart showing the delay operation of a delay-on relay employed in the preferred embodiment of the invention;

FIG. 7 is a time chart showing the delay operation of a delay-off relay employed in the preferred embodiment of the invention; and FIG. 8 is a time chart showing the operation of contacts in the holding relay circuit of the first zone, as shown in FIG. 5.

DESCRIPTION OF THE PREFERRED EMBODIMENT

Figure 3:
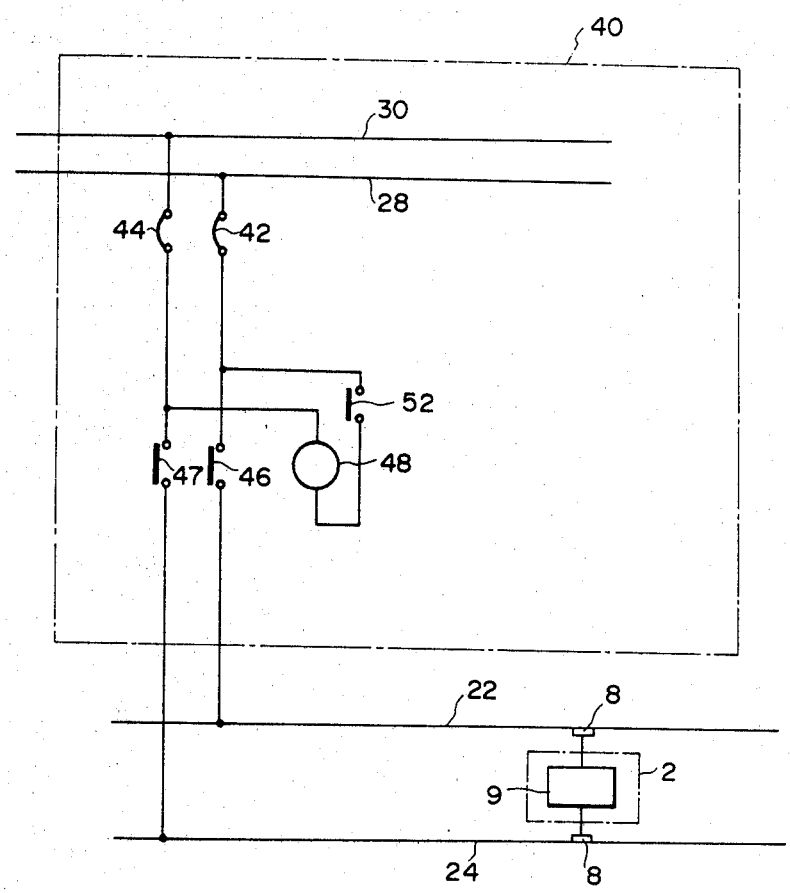
FIG. 3 is a schematic diagram of the conventional power supply control circuit.
Figure 4:
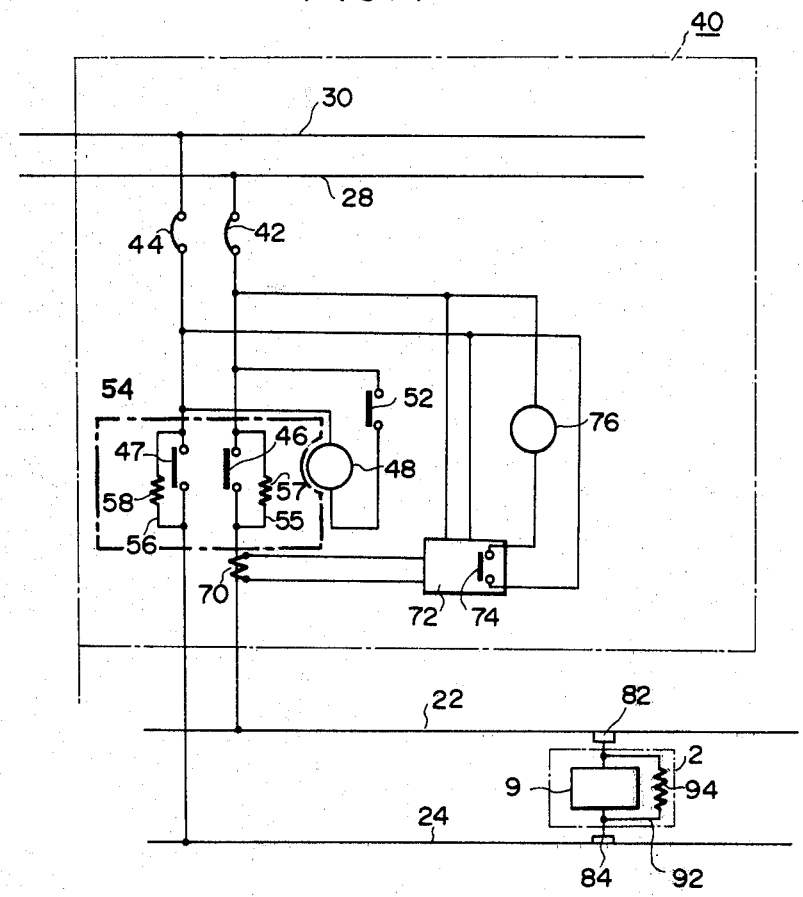
FIG. 4 is a schematic diagram of a power supply control circuit including a vehicle or carriage position detecting means, in accordance with the preferred embodiment of the invention.

Referring now to FIG. 4, there is illustrated an improved electric power supply control means co-operative with a vehicle or carriage position detecting means, which in FIG. 4 is illustrated in a manner similar to FIG. 3.

For convenience of description, features and elements corresponding to the features and elements in the prior art, shown in FIG. 3, and having substantially the same functions, are indicated by the same reference numerals.

Figure 1:
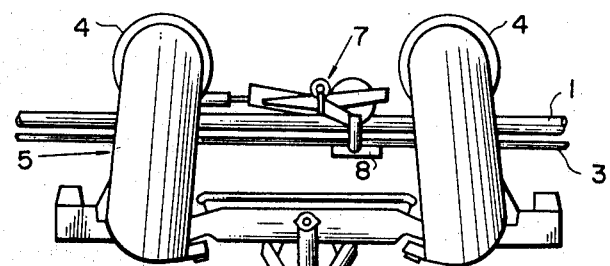
FIG. 1 is a schematic side elevational view of a typical construction of an aerial transport system.
Figure 1:
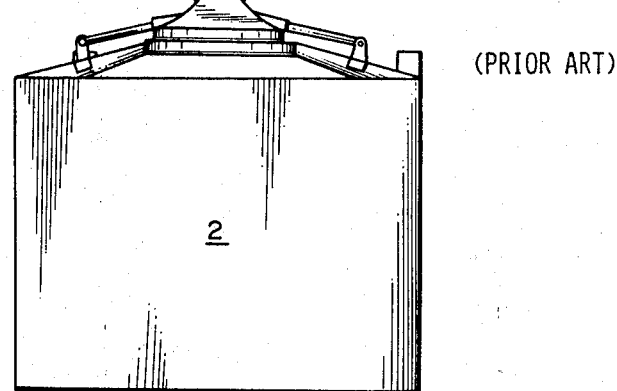
Figure 2:
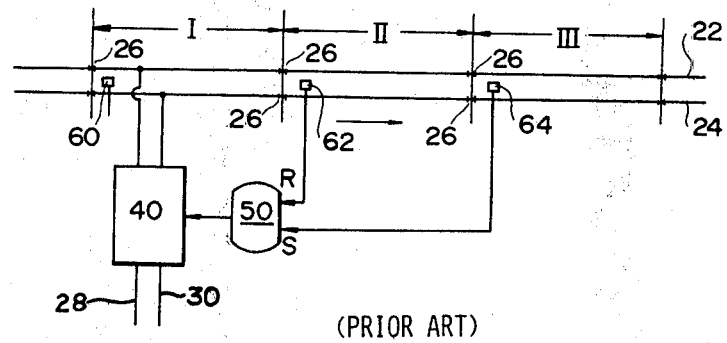
FIG. 2 is a schematic diagram of an electric power supply system for the aerial transport system.

A pair of current-carrying cables 22, 24 are both separated at regular intervals by insulating members in order to define independent electric power supply zones in a way similar to that illustrated in FIG. 2. The intervals between respective insulating members will be determined with regard to the expected maximum speed of the vehicle or carriage. In other words, the minimum length of each zone may be determined from the braking distance, for the safety and security of the automatic centralized control of the vehicles or carriages. Thus, the length of each power supply zone will normally be longer than the braking distance of a vehicle or carriage travelling at the maximum speed, so that even in the worst possible case a carriage cannot overshoot more than one power supply zone, and collisions between carriages can be prevented.

The vehicle or carriage 2 has an electrical driving means 9 such as an electric driving motor which is associated with an automatic braking means (not shown). The automatic braking means may be mounted on the vehicle or carriage and operates to brake the vehicle or carriage when electric power is not supplied or is less than a certain required current. In practice, an automatic braking device which operates when an electric power is not supplied thereto, can be embodied in various fashions. In the purpose sought in such vehicle or carriage, it may be apparent to those skilled in the art that one of the preferred constructions may comprise an electromagnetic brake having a braking member biased by a resilient member toward the driving wheels and a means pulling the braking member in the direction away from the driving wheels against the force of resilient member. The means is operated by electric power. Thus, the electromagnetic brake operates to brake the vehicle or carriage when the means for pulling the braking member is in an inoperative position.

The vehicle or carriage 2 further has a current collecting unit 7 including a pair of current shoes 82, 84 which resiliently contact the current-carrying cables 22, 24. The shoes 82, 84 supply electric power to the vehicle or carriage 2. Between the shoes 82, 84 is provided a bypass circuit 92 parallel with the driving means and directly connecting the shoes 82, 84. A resistor 94 is provided in the bypass circuit 92 so as to limit the electric current flowing therethrough in co-operation with hereafter described resistors in the electric power supply circuit.

The current-carrying cables 22, 24 are connected to power cables 28, 30 through an electric power supply control means 40.

The power supply control means generally comprises a switching circuit including a contactor 48 electrically associated with a holding relay circuit 50, further described below, through contact 52 of the holding relay 50. The contactor 48 has a pair of contacts 46, 47 respectively interposed between the power cables 28, 30 and current-carrying cables 22, 24 in an electric power supply circuit 54. A pair of bypass circuits 55, 56, including resistors 57, 58, respectively, are provided in the power supply circuit 54 in parallel with the contacts 46, 47 of the contactor 48 and directly connecting with the power supply circuit 54 to the current carrying cables 22, 24. Thereby, even when the contactor 48 is not excited and thus the contacts 46, 47 of the contactor 48 are opened, a small electric current may flow in the power supply circuit 54.

The bypass circuit 92 of the carriage 2 thus co-operates with the bypass circuits 55, 56 to form an electric circuit, even when the driving means of the vehicle or carriage is stopped for some reason, for example, because a previous vehicle or carriage is still in the adjacent zone. The current flowing in the power supply circuit through the bypass circuit 92 and the bypass circuits 55, 56 is given by the following formula:

$$I = E/2R_1 + R_2 + R_0)$$

wherein
  $R_1$: value of resistors 57 and 58
  $R_2$: value of resistor 92
  $R_0$: resistance of power cables and current-carrying cables
  E: supplied voltage In the preferred embodiment, the values of the resistors 57, 58 and 94 are selected so as to pass a current in the range 10 mA to 30 mA, when a carriage 2 is in the zone but the driving means thereof is not operating.

The current flowing in the zone is detected by a current transformer 70 provided between the current-carrying cable 22 and contact 46 of the contactor 48. A gate 72 having a contact 74 which is closed when the current flowing therethrough exceeds a predetermined value, and which is in practice a leakage detector, is connected to the current transformer 70. The contact 74 of the gate 72 is connected to detecting relay 76 which detects a current flowing therethrough.

Thus, if there is a carraige in the zone, at least the predetermined minimum current, for example, 10 mA to 30 mA, flows within the power supply circuit. The current transformer 70 then supplies a current to the gate 72. The gate 72 is thus energized to close the contact 74 to allow a current to flow to the detecting relay 76, which then operates. Thus, the existence of a carriage in the zone can be detected.

Clearly, if a carriage 2 within the zone is being driven, the current flowing will exceed the predetermined minimum value and will be detected, the same as if it is stationary. The gate 72 is not an essential feature of the invention, and in a simpler embodiment the current transformer 70 may be directly connected to the detecting relay 76. In the preferred embodiment, however, the gate 72 is used to ensure that tiny stray currents do not affect the power supply control means.

Figure 5:
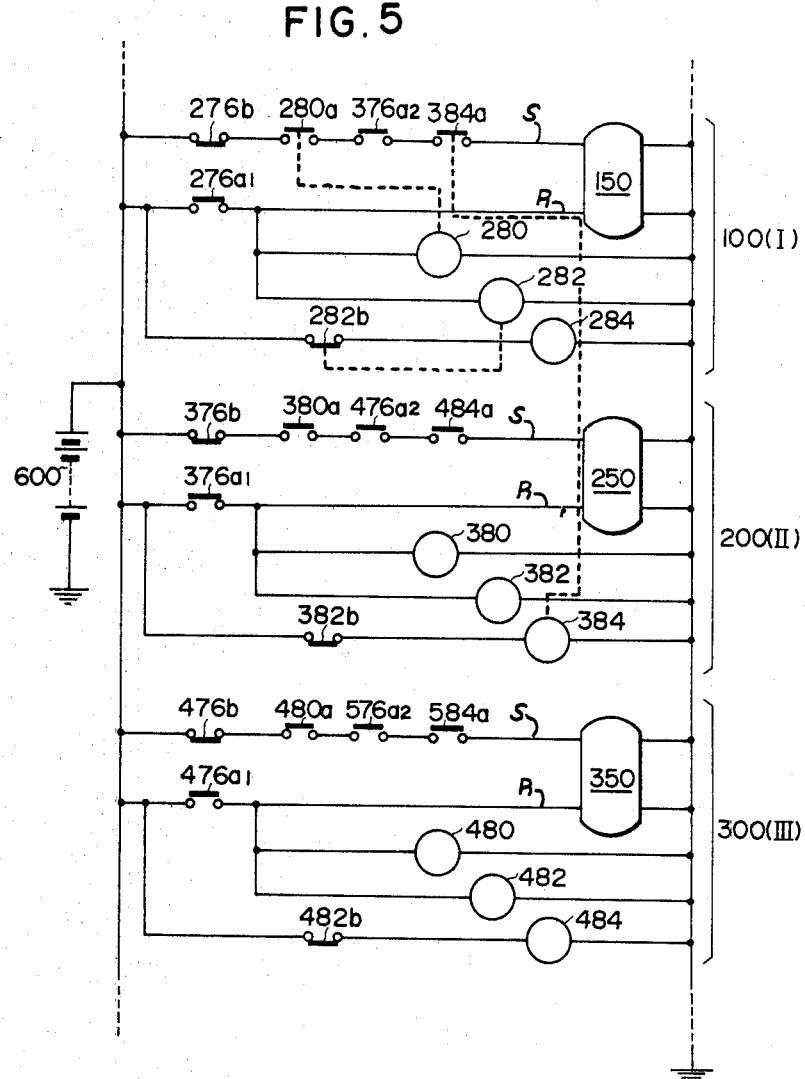
FIG. 5 shows a circuit construction for controlling the holding relays of the power supply control circuit of FIG. 4.

Now referring to FIGS. 5 through 8, there are illustrated control circuits including holding relays, corresponding to the holding relay 50 of FIG. 2. In FIG. 5, are shown control circuits 100, 200, 300 . . . which correspond respectively to independent electric power supplying zones I, II, III, . . . The control circuits 100, 200, and 300 include holding relays 150, 250 and 350 respectively which correspond to the holding relay 50 of FIG. 2.

Each holding relay 150, 250 and 350 has a set-input terminal S and reset-input terminal R both of which are connected with carriage position detecting means in the electric power supply control means of the following power supply zones. Namely, the holding relay 150 of the first power supply control means in the first zone I is connected to the vehicle or carriage position detecting means of the second power supply zone II.

Each holding relay 150, 250, 350 further has contacts connected with the contactor of the power supply control circuit, as generally shown in FIG. 4. Thus, each holding relay 150, 250, 350 is electrically associated with the power supply control circuit in order to break the power supply control circuit when a preceding carriage is in the adjacent zone. This function of the holding relay and the contactor of the power supply control circuit will have been understood from the above description with reference to FIG. 4.

Now, we go into further detail of the holding relay control circuit. For better understanding and convenience for illustration of the preferred embodiment, the features and elements of the holding relay control circuit will be described in terms of the functions thereof.

With respect to the holding relay control circuit 100 of the first zone I, the set-input terminal S of the holding relay 150 is connected with an auxiliary power source 600 through normally closed contact 276b of a detecting relay (corresponding to the detecting relay 76 of FIG. 4) of the vehicle or carriage position detecting means in the second zone II, normally opened contact 280a of an off-delay relay 280 co-operative with the detecting relay of the vehicle or carriage position detecting means in the second zone, normally opened contact 376a₂ of the detecting relay of the vehicle or carriage position detecting means in the third zone III and normally opened contact 384a of an on-delay relay 384 co-operative with the detecting relay of the third zone.

The on-delay relay 384 is connected with a normally closed contact 382b of an on-delay relay 382 so as to be operated as the on-delay relay 382 is operated. The contacts 276b, 280a, 376a₂ and 384a in series constitute and AND circuit, so that to connect the set-input terminal S of the holding relay 150 to the power source 600 requires all the contacts 276b 280a, 376a₂ and 384a to be closed.

The time delay relays, referred to as on-delay relays and off-delay relays, are of a well known type and the operation thereof will be briefly described with reference to FIGS. 6 and 7.

Suppose that an off-delay relay is turned on at a time $t_1$ and turned off at a time $t_2$ as seen in waveform (A) of FIG. 6, its contact a closes at the time $t_1$ and opens at a time $t_2'$ which comes a predetermined delay time $\tau$ after the time $t_2$ as seen in waveform (B) of FIG. 6, whereas its contact b opens at the time $t_1$ and closes at the time $t_2'$ as seen in waveform (C) of FIG. 6. Again suppose that an on-delay relay is turned on at a time $t_1$ and turned off at a time $t_2$ as seen in waveform (A) of FIG. 7, its contact a opens at a time $t_1'$ which comes a predetermined delay time $\tau$ after the time $t_1$ and opens at the time $t_2$ as seen in waveform (B) of FIG. 7, whereas its contact b opens at the time $t_1'$ and closes at the time $t_2$ as seen in waveform (C) of FIG. 7.

The operation of the keep relay control circuit of FIG. 5 will be described with reference to the circuit 100 of FIG. 5.

The reset-input terminal R of the holding relay 150 is connected with the power source 600 through normally opened contact 276a₁ of the detecting relay of the second zone II.

When a vehicle or carriage is present within the zone II, at least a predetermined minimum electric current flows within the second zone II. Thus, the detecting relay of the vehicle or carriage position detecting means in the second zone II operates to open the normally closed contact 276b thereof to break the circuit connecting the power source to the set-input terminal S of the holding relay 150 and to close normally opened contact 276a₁. This results in supplying electric power to the reset-input terminal R of the holding relay 150 to open the contact (corresponding to contact 52 of FIG. 4) thereof and thus to open the contacts of the contactor (corresponding to contactor 48 of FIG. 4) of the power supply control circuit in the first zone I. Thereby, in the first zone I, as shown in FIG. 4, the current-carrying cables 22, 24 are connected with the power cable 28, 30 through the bypass circuits 55, 56 to limit the electric current to between 10 mA to 30 mA. Now, if a vehicle or carriage enters into the first zone I, only this very small current is supplied to the driving means 9 of the carriage, so effecting power is shut off, and the driving means is not actuated, but on the other hand a sufficient minimum current flows to enable the vehicle or carriage position detecting means for the first zone I to operate. The reduction of current to this minimum value may also be used to operate the automatic brake device contained in the vehicle or carriage to stop the vehicle or carriage within the zone I.

It should be noted parenthetically that by employment of such automatic braking, when electric power supply to the power cables is interrupted and all the control circuits become inoperative, the vehicle or carriage will be safely stopped by actuation of the braking device.

At the same time, because contact 276a₁ is closed, the off-delay relay 280 is energized to close the normally opened contact 280a. The state of the remaining contacts 376a₂ and 384a depends on whether or not there is a vehicle or carriage in the zone III. If there is, then the vehicle or carriage in the zone II will be reached when zone III is empty. For the purpose of this explanation, therefore, it may be assumed that there is no vehicle or carriage in the zone III. Accordingly, contacts 376a₁ and 376a₂ will be opened and on-delay relay 382 will not be operated. Therefore normally closed contacts 382b are closed and the on-delay relay 384 operates to close the normally opened contact 384a.

When the vehicle or carriage leaves the second zone II and enters the third zone III, the detecting relay of the vehicle or carriage position detecting means in the second zone II becomes inoperative, thereby allowing the normally opened contact 276a₁ to open, thus cutting off power to the reset-input terminal R of the holding relay 150. In turn, then, the normally closed contact 276b moves to a closed position. When the contact 276a₁ is opened, the off-delay relay 280 is deenergized, but the contact 280a remains closed for the predetermined delay $\tau_1$ (as shown in FIG. 6). At the same time, the detecting relay of the third zone III detects an electric current above the predetermined minimum value flowing through the power supply circuit in the third zone III; it closes normally opened contacts 376a₁ and 376a₂, and opens normally closed contact 376b. Therefore, just after the moment the carriage enters the zone III all four of contacts 276b, 280a, 376a₂ and 384a are closed, and power is supplied to the set-input terminal S of the holding relay 150. Power continues to be supplied until either of contacts 280a and 384a opens. Contact 280a is opened when the time delay $\tau_1$ of the off-delay relay 280 has elapsed. The contact 384a opens when the time delay $\tau_2$ of the on-delay relay 382 has elapsed. On-delay relay 382 is energized when the contacts 376a₁ are closed; after the delay $\tau_2$, contacts 382b are opened, on-delay relay 384 is deenergized, and immediately contact 384a opens. Thus power is supplied to the set terminal for a pulse of length the minimum of $\tau_1$ and $\tau_2$, and the holding relay is energized, and connects the power supply to the zone I by means of the contactor.

In the preferred embodiment, the delay time $\tau_2$ of the on-delay relay 384 is shorter than the delay time $\tau_1$ of the off-delay relay 280, and thus the pulse duration is $\tau_2$.

FIG. 8 shows the state of contacts 276a₁, 276b, 280a, 376a₂, 376a₁, 382b and 384a and the supply of power to the set-input terminal of holding relay 150. The presence of a single vehicle or carriage in zone I, II or III is shown respectively by sections A, B and C. If we now consider the vehicle or carriage leaving zone III, contacts 376a₁ and 376a₂ open immediately, and on-delay relay 382 is deenergized. Immediately, contact 382b closes, and energizes on-delay relay 384. After the delay $\tau_3$ associated with the on-delay relay 384 has elapsed, contact 384a closes. It will be seen from FIG. 8 that this delay $\tau_3$ prevents a spurious pulse to the set-input terminal S of the holding relay 150 at the moment a vehicle or carriage just happens to enter zone II.

With respect to the holding relays 250 and 350, and control circuits 200 and 300 of the second and third power supply zones II and III, each control circuit 200, 300 is constructed substantially the same as the control circuit 100 of the first zone I. The function of each control circuit is also substantially the same as that of control circuit 100.

The set-input terminal S of the holding relay 250 is connected with the power source 600 through normally closed contact 376b of vehicle or carriage position detecting means of the third zone III, normally opened contact 380a of off-delay timer 380, normally opened contact 476g₂ of the vehicle or carriage position detecting means of the fourth zone IV and normally opened contact 484a of on-delay timer 484. The on-delay timer 484 is associated with an on-delay timer 482 through normally closed contact 382b of the on-delay timer 382. While, the reset-input terminal R of the holding relay 250 is connected with the power source 600 through normally opened contact 376a₁ of the vehicle or carriage position detecting means in the third zone.

The set-input terminal S of the third holding relay 350 of the third zone III is connected to the power source 600 through normally closed contact 476b of the detecting relay of the vehicle or carriage position detecting means in the fourth zone IV, normally opened contact 480a of off-delay timer 480, normally opened contact 576a₂ of the detecting relay of vehicle or carriage position detecting means in the fifth zone and normally opened contact 584a of an on-delay timer in the fifth zone, corresponding to on-delay timers 384 and 484, associated with an on-delay timer corresponding to on-delay timers 382 and 482 through a normally closed contact corresponding to closed contacts 382b and 482b. The reset-input terminal R of the holding relay 350 is connected with the power source 600 through normally opened contact 476a₁ of detecting relay of vehicle or carriage position detecting means in the fourth zone.

In the second zone, the normally closed contact 376b, the normally opened contacts 380a, 476a₂, 484a and the normally opened contacts 376a₁ are respectively corresponding to the normally closed contact 276b, the normally opened contacts 280a, 376a₂, 384a and the normally opened contact 276a₁ of the first zone. The contacts 476b, 480a, 576a₂, 584a and 476a₁ of the holding relay control circuit 300 are also corresponding to the contacts 276b, 280a, 376a₂, 384a and 276a₁ of the first holding relay control circuit 100. Thereby, the functions of respective contacts of the second and third holding relay control circuits are substantially same as the contacts of the first holding relay control circuit 100.

It should be noted, since respective holding relays 150, 250 and 350 can keep their operative and inoperative positions until the next charge of electric power from the power source 600, the pulse-like voltage supplied to respective set-input terminals S of the holding relays 150, 250 and 350 may efficiently change the position of the holding relays from inoperative to operative.

At a junction or confluence of the cableway or tramway, or at a portion within or adjacent to a station, the power supply control circuit may be provided on each branch of the cableway or tramway. Each control circuit will be arranged with holding relays and contacts (corresponding to the contact 52 of FIG. 4), so that they allow the selective supplying of electric power to either branch circuit. Each control circuit will be associated with vehicle or carriage position detecting means in each branched zone.

Thus, the present invention, constructed as above-mentioned, fulfills all the objects and advantages sought in the invention.

While the present invention has been shown and described with respect to the preferred embodiment, it should not, however, be considered as limited to this embodiment or other detailed embodiments. Further, variations could be made to the form and the details of any parts or elements, without departing from the principles of the invention. For example, the pair of time delay relays 282 and 284 in FIG. 5 may be replaced, in an alternative and equivalent circuit, by a relay with both on and off delays. Therefore, it is desired that the scope of the present invention, and the breadth of the protection sought to be granted by Letters Patent, should be defined solely by the accompanying claims.

What is claimed is:

1. In an aerial transport system having an aerial track having therealong a pair of electric current-carrying cables in parallel relationship with respect to one another and with respect to the track, and self-propelled vehicles, each having an electric current-collecting means to collect electric power from the current-carrying cables and to supply the power to an electrical driving means mounted on the vehicle so as to drive wheels engaging with the track to drive the vehicle along the track, said current-carrying cables being separated at longitudinal given intervals so as to define respectively independent electric power supply zones, said transport system including a means for controlling the electric power supply for the vehicle, said control means comprising:

a power supply cable connected with an electric power source and transporting the power therethrough;

a control circuit interposed between said current-carrying cables and said power supply cable for connecting therebetween, said control circuit comprising a power supply circuit connecting said current-carrying cables and said power supply cable, said control circuit being switched between a conductive state for supplying the power to said current carrying cables and a non-conductive state for blocking the power supply;

a first detecting means for detecting the presence of a said vehicle within a power supply zone defined by said separated current-carrying cables, said first detecting means switching said power supply circuit to said conductive state when the vehicle is present within the zone;

a second detecting means for detecting an electric current flowing in said control circuit in the zone when said power supply circuit is in the conductive state; and a switching circuit provided in said control circuit and connected with a corresponding second detecting means in an adjacent forward power supply zone, said switching circuit being responsive to said corresponding second detecting means for blocking the power supply through said control circuit when said corresponding second detecting means detects the presence of the current flow in the power supply circuit of said adjacent forward zone.

2. An aerial transport system having a power supply control means as recited in claim 1, wherein said first detecting means comprises first bypass circuits interposed between said power cable and said current-carrying cables in parallel relationship to switching contacts of said electric power supply control means.

3. An aerial transport system having a power supply control means as recited in claim 2, wherein said first bypass circuits include resistors to determine a value of an electric current flowing through said circuit.

4. An aerial transport system having a power supply control means as recited in claim 3, wherein said resistors of said first bypass circuits determine a minimum intensity of current flowing through said power supply control circuit when the vehicle is present in said zone.

5. An aerial transport system having a power supply control means as recited in either claim 3 or 4, in which the values of said resistors are selected so as to determine the minimum current flowing in said bypass circuits when a vehicle is present in the relevant zone to a value in the range 10 mA to 30 mA.

6. An aerial transport system having a power supply control means as recited in any one of claims 2 to 4 inclusive, wherein said first detecting means includes a second bypass circuit provided on the vehicle and cooperating with said first bypass circuits.

7. An aerial transport system having a power supply control means as recited in any one of claims 1 to 4 inclusive, wherein said second detecting means includes a normally opened gate, said gate closing when said second detecting means detects at least a predetermined minimum value of current flow in said control circuit.

8. An aerial transport system having a power supply control means as recited in claim 7, wherein said second detecting means comprises a holding relay provided in said control circuit and a detecting relay associated with said holding relay, said holding relay being associated with said corresponding second detecting means in said adjacent forward zone and being responsive thereto to switch the position of the holding relay to a reset position when said corresponding second detecting means in said adjacent forward zone detects the presence of current flow exceeding said predetermined value in said adjacent forward zone.

9. An aerial transport system having a power supply control means as recited in claim 7, wherein said switching circuit comprises a holding relay control circuit associated with a holding relay in the same zone, said switching circuit being operable to switch the position of said holding relay in the same zone between a set position and a reset position when said second detecting means in said adjacent forward zone detects the current exceeding said minimum value, said holding relay control circuit being responsive to said second detecting means to switch the holding relay into the reset position.

10. An aerial transport system having a power supply control means as recited in claim 9, wherein each of said holding relay control circuits includes an on-delay timer for preventing the circuit from malfunction.

11. An aerial transport system having a power supply control means as recited in claim 9, wherein each of said holding relay control circuits includes an off-delay timer for preventing the circuit from malfunction.

12. An aerial transport system having a power supply control means as recited in claim 9, wherein each of said holding relay control circuits includes an on-delay timer and an off-delay timer for preventing the circuit from malfunction.

13. An aerial transport system having a control system as recited in claim 9, wherein said holding relay control circuit is further associated with the second detecting means of the forward zone two zones away.

14. An aerial transport system having a control system as recited in claim 13, wherein, in a zone, a signal is applied to a reset terminal of the holding relay if a signal is received from the second detecting means in said adjacent forward zone.

15. An aerial transport system having a power supply control means as recited in any one of claims 1 to 4 inclusive, wherein said second detecting means is further connected with the power supply circuit of the power supply zone two zones rearward so as to cooperate with the second detecting means of the adjacent rearward power supply zone.

16. In an aerial transport system having an aerial track having therealong a pair of power supply cables, a pair of electric current-carrying cables in parallel relationship with respect to one another and with respect to the track and being separated at longitudinal regular intervals so as to define respectively independent electric power supply zones, self-propelled vehicles, each having an electric current collecting means to collect electric power from the current-carrying cables and to supply the power to an electric driving means mounted on the vehicle so as to drive wheels engaging the track for propelling the vehicle along the track, said transport system including an electric power supply control means for controlling driving of the vehicle, said electric power control means comprising:

a first circuit for each power supply zone interposed between the power supply cables and the current-carrying cables for comprising a power supply circuit therewith;

a second circuit provided in said vehicle, which second circuit completes the power supply circuit while the vehicle travels in the power supply zone;

a means for detecting an intensity of electric current which flows through said power supply circuit in said power supply zone so as to detect the existence of a vehicle in said zone; and a third circuit associated with said first circuit and a corresponding detecting means in an adjacent forward power supply zone, said third circuit serving to block the electric current flow in said power supply circuit when said detecting means in said adjacent forward zone detects the electric current exceeding a predetermined level.

17. An aerial transport system having a power supply control means as recited in claim 16, wherein said first circuit includes a resistor to determine an electric current flowing through said first circuit.

18. An aerial transport system having a power supply control means as recited in claim 17, wherein said resistor of said first circuit determines a minimum value of current flowing through said power supply control circuit when the vehicle is present in said zone.

19. An aerial transport system having a power supply control means as recited in claim 18, wherein said resistor is selected so that the value thereof determines the minimum intensity of current in the range 10 mA to 30 mA.

20. An aerial transport system having a power supply control means as recited in claim 16 or 17, wherein said detecting means includes a gate having a normally opened contact, said contact being operative to close when the detecting means detects at least the predetermined minimum intensity of electric current.

21. An aerial transport system having a power supply control means as recited in claim 20, wherein a holding relay is provided in each power supply zone, respective contacts of which are associated with said first circuit, and said detecting means includes a detecting relay having a contact electrically associated with the holding relay of a corresponding power supply control circuit of an adjacent rearward power supply zone.

22. An aerial transport system having a power supply control means as recited in claim 16 or 17, wherein said third circuit is further associated with a corresponding detecting means of a power supply zone two zones forward so as to cooperate with the detecting means of said adjacent forward power supply zone.

23. An aerial transport system having a power supply control means as recited in claim 16, wherein said detecting means includes a detecting relay having a contact associated with a corresponding third circuit in an adjacent rearward power supply zone, said detecting relay being responsive to the intensity of current exceeding said predetermined level.

24. An aerial transport system having a power supply control means as recited in claim 16, wherein said third circuit includes:

a holding relay provided in each power supply zone, respective contacts of which are associated with said first circuit;

a holding relay control circuit being responsive to detection in a corresponding power supply circuit in an adjacent forward power supply zone of an intensity of current exceeding the predetermined level, which holding relay control circuit moves said holding relay to a reset position when the intensity of current in said corresponding power supply circuit is detected exceeding the predetermined level; and an electric power source providing electric power for said holding relay control circuit.

25. An aerial transport system having a power supply control means as recited in claim 24, wherein said holding relay control circuit includes an on-delay timer for preventing the circuit from malfunction.

26. An aerial transport system having a power supply control means as recited in claim 24, wherein said holding relay control circuit includes an off-delay timer for preventing the circuit from malfunction.

27. An aerial transport system having a power supply control means as recited in claim 24, wherein said holding relay control circuit includes an on-delay timer and an off-delay timer for preventing the circuit from malfunction.

28. In an aerial transport system having an aerial track having therealong a pair of electric current-carrying cables in parallel relationship with respect to one another and with respect to the track, and a self-propelled vehicle having an electric current collecting means to collect electric power from the current-carrying cables and to supply the power to an electric driving means mounted on the vehicle so as to drive wheels engaging the track for propelling the vehicle along the track, said current-carrying cables being separated at longitudinal given intervals so as to define respectively independent electric power supply zones, which transport system includes a power supply control means for controlling the power supply for each of the power supply zones comprising:

power supply cables connected with an electric power source and transmitting the electric power therethrough, which power supply cables are respectively sequentially extending along the current-carrying cables in parallel relationship therewith;

a first circuit interposed and connected between said power supply cables and said current-carrying cables, said first circuit comprising, with said power supply cables and said current-carrying cables, a power supply circuit for each power supply zone;

a second circuit provided in said vehicle and bypassing said driving means in said vehicle, which second circuit completes said power supply circuit in the power supply zone in which the vehicle is travelling;

a holding relay provided in each power supply zone and associated with said first circuit for switching between a set position permitting the current flow through said first circuit and a reset position blocking the current flow therethrough, said holding relay having contacts associated with respective power supply controlling contactors of the first circuit in each power supply zone;

a holding relay control circuit for controlling each said holding relay to switch the position thereof between said set position and said reset position, said holding relay control circuit being associated with a current-responsive relay provided in an adjacent forward power supply zone and being responsive to an intensity of current exceeding a predetermined level flowing in said adjacent forward zone to position said holding relay in said reset position; and an auxiliary power source to provide electric power for said holding relay control circuit.

29. An aerial transport system having a power supply control means as recited in claim 28, wherein a current-responsive relay is provided in said holding relay control circuit and cooperates with said holding relay, said current-responsive relay being responsive to a current having an intensity exceeding said predetermined level to switch said holding relay into the reset position.

30. An aerial transport system having a power supply control means as recited in claim 28 or 29, wherein said current-responsive relay has a contact electrically associated with said holding relay.

31. An aerial transport system having a power supply control means as recited in claim 30, wherein said holding relay control circuit is further connected with the holding relay of the power supply zone two zones to the rear so as to co-operate with the holding relay control circuit of an adjacent rearward power supply zone.

32. An aerial transport system having a power supply control means as recited in claim 28, wherein each of said holding relay control circuits includes an on-delay timer for preventing the circuit from malfunction.

33. An aerial transport system having a power supply control means as recited in claim 28, wherein each of said holding relay control circuits includes an off-delay timer for preventing the circuit from malfunction.

34. An aerial transport system having a power supply control means as recited in claim 28, wherein each of said holding relay control circuits includes an on-delay timer and an off-delay timer for preventing the circuit from malfunction.

35. An aerial transport system having a power supply control means as recited in claim 34, wherein said holding relay has a respective set-input terminal and a reset-input terminal which are connected by respective third and fourth circuits to said power source.

36. An aerial transport system having a power supply control means as recited in claim 35, wherein said third circuit includes a normally closed contact of the current-responsive relay of the adjacent forward zone, a normally opened contact of the current-responsive relay in the zone two zones forward, a normally opened contact of the on-delay timer in the adjacent forward zone and a normally opened contact of the off-delay timer in the zone two zones forward.

37. An automatic vehicle control system in an aerial transport system including an aerial track and self-propelled vehicles travelling along the aerial track, said system comprising:
 a power cable connected with an electric power source and extending along said aerial track in parallel relationship therewith;
 a current-carrying cable extending along said aerial track and separated at given intervals for defining independent power supply zones;
 a first circuit for each power supply zone connected between said power cable and said current-carrying cable, which first circuit comprises a power supply circuit in a said power supply zone and has a switch means variable between a first position permitting current flow within said power supply circuit in the power supply zone and a second position blocking the current flow;
 a second circuit provided in a first vehicle so that it may complete said power supply circuit when the vehicle travels in said power supply zone;
 a current detecting means associated with said switch means in one zone rearward from said power supply zone and responsive to the current flowing in said power supply circuit, said current detecting means switching said switch means from said first position to said second position for stopping propelling of a second vehicle travelling in said one zone rearward from said power supply zone when the first vehicle is present in the power supply zone.

38. An automatic vehicle control system in an aerial transport system including an aerial track, a vehicle travelling along the aerial track, said control system comprising:
 a power cable connected with an electric power source and transmitting the electric power therethrough, said power cable extending along said aerial track in parallel relationship therewith;
 a current-carrying cable extending along said aerial track and separated at given intervals for defining respectively independent power supply zones;
 a first circuit connecting said power cable and said current-carrying cable for comprising a power supply circuit therewith;
 a switch means incorporated with said first circuit and being switchable between a first position permitting current flow through said power supply circuit and a second position blocking the current flow;
 a second circuit provided in said vehicle in parallel relationship with a driving means of the vehicle with respect to said power source, said second circuit completing said power supply circuit upon the vehicle travelling in said power supply zone;
 a current detecting means connected with the power supply circuit so that the current flowing through the power supply circuit flows therethrough, said current detecting means being responsive to an intensity of current exceeding a predetermined level, which current detecting means becomes operative to switch a corresponding switch means of a power supply zone one zone rearward from said first position to said second position when the current detecting means detects the intensity of the current exceeding the predetermined level, said current detecting means cooperating with a corresponding current detecting means in a power supply zone two zones forward so that it becomes operative to detect the presence of the current intensity when said current detecting means detects the intensity of current exceeding the predetermined level.

39. An automatic vehicle travel control system in an aerial transport system including an aerial track and a self-propelled vehicle travelling along the aerial track, said control system comprising:
 a power cable connected with an electric power source and extending along said aerial track in parallel relationship therewith;
 a current-carrying cable extending along said aerial track in parallel relationship therewith and supplying the electric power for a driving means of the vehicle, which current-carrying cable defines a plurality of power supply zones, each power supply zone being electrically independent from other zones;
 a first circuit connected between said power cable and said current-carrying cable, which first circuit comprises a power supply circuit with said power cable and said current-carrying cable in each power supply zone;

a switch means incorporated in said first circuit and being switchable between a first position permitting current flow in said power supply circuit in the power supply zone and a second position blocking the current flow therethrough;

a bypass circuit incorporated in said first circuit in parallel relationship with said switch means for permitting the current flow in the power supply circuit even when the switch means is in said second position, said bypass circuit defining a minimum current value flowing through the power supply circuit when the vehicle is present in said power supply zone;

a second circuit provided in said vehicle in parallel relationship with said vehicle driving means, said second circuit completing the power supply circuit when the vehicle travels in said power supply zone; and a current detecting means connected with the power supply circuit so that the current flowing through the power supply circuit flows therethrough, said current detecting means being responsive to an intensity of current exceeding a predetermined level, which current detecting means becomes operative to switch a corresponding switch means of a power supply zone one zone rearward from said first position to said second position when it detects the intensity of the current exceeding the predetermined level, said current detecting means cooperating with a corresponding current detecting means in a power supply zone two zones forward so that it becomes operative to detect the presence of the current intensity when said current detecting means detects the intensity of current exceeding the predetermined level.

* * * * *